May 21, 1940.  E. J. JAGLER  2,201,492

RATCHET ACTION

Filed Aug. 25, 1938

Edwin J. Jagler, INVENTOR

BY Victor J. Evans & Co.

WITNESS  ATTORNEYS

Patented May 21, 1940

2,201,492

UNITED STATES PATENT OFFICE 2,201,492

RATCHET ACTION

Edwin J. Jagler, Chicago, Ill.

Application August 25, 1938, Serial No. 226,829

3 Claims. (Cl. 192—43.1)

My invention relates to tools such as socket wrenches and the like and includes among its objects and advantages the provision of an improved adapter.

Figure 1:
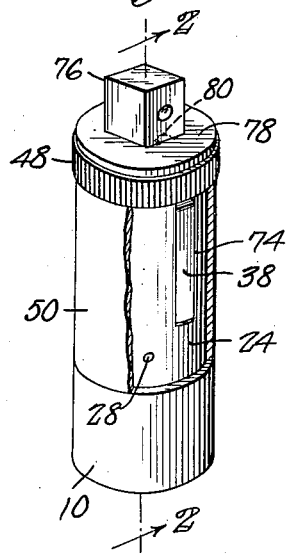
Figure 1 is a perspective view of my invention with certain parts broken away for the sake of clearness.

In the embodiment selected to illustrate my invention, I make use of a head 10 provided with a square opening 12 for the reception of bolt heads, nuts and the like. Head 10 includes a body 14 of smaller diameter than the head and provided with a plurality of longitudinal grooves 16. Body 14 terminates in a shank 18 rotatably positioned inside a bore 20 in an actuating element 22. Body 14 is circulating cross section and carries a collar 24 which lies upon the shoulder 26 of the head 10. The collar 24 is keyed against relative longitudinal movement of the body 14 by reason of two pins 28 which extend through the groove 30 in the body and are anchored in openings 32 in the collar 24.

Figure 4:
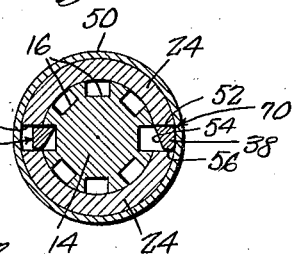
Figure 4 is a sectional view along the line 4—4 of Figure 2.
Figure 5:
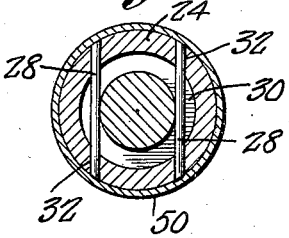
Figure 5 is a sectional view along the line 5—5 of Figure 2.

Shank 18 includes a groove 34 within which one end of a pin 36 extends. The pin is threaded into the element 22 and restrains relative longitudinal shifting between the body 14 and the element 22. However the pin 36 lies freely in the groove 34 so as to permit the element 22 to be rotated upon the shank 18. Within two of the grooves 16 I position dogs 38 which extend longitudinally of the body 14. The dogs are provided with right-angular reaches 40 which pivot on the ledge 42 on the element 22. Each dog includes a cam reach 44 which extends into a recess 46 in a cam ring 48. Between the cam ring 48 and the shoulder 26 I interpose a sleeve 50. Sleeve 50 constitutes a grip as well as a housing for enclosing the dogs 38. Referring to Figure 4, each dog includes a wide face 52, an angular face 54 and a narrow face 56. The dogs are identical in construction with the exception that the faces 52, 54 and 56 are reversed when viewed according to Figure 4.

Figure 3:
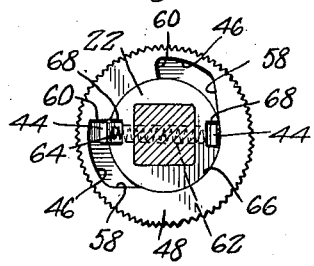
Figure 3 is a sectional view along the line 3—3 of Figure 2.

Sleeve 50 is of such diameter as to permit a limited amount of pivotal movement of the dogs 38. Pivotal movement of the dogs is consummated through the medium of the cam ring 48. Referring to Figure 3, each recess 46 includes a cam surface 58 and an abutment face 60. Both recesses are of identical size and configuration with the exception of reversal when viewed according to Figure 3.

Figure 2:
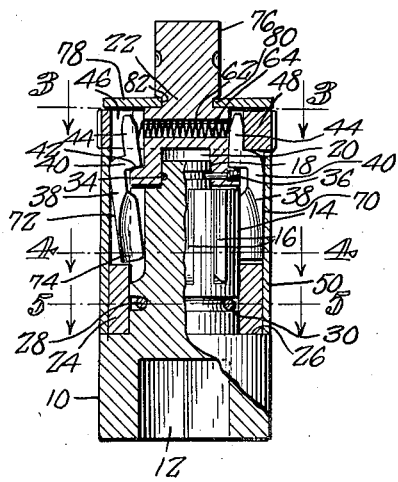
Figure 2 is a longitudinal sectional view along the line 2—2 of Figure 1.

Element 22 includes a transverse bore 62 within which I mount a spring 64 having its ends arranged in pressure relation with the cam reaches 44 of the dogs 38. The cam ring 48 includes an opening 66 which fits snugly about the element 22, while the latter is provided with diametrically opposed grooves 68 for housing the cam reaches 44. Recesses 46 are so arranged that when one cam face 58 cams the reach 44 of its respective dog 38 into its respective groove 68 that dog will take the position indicated at 70 in Figure 2. Under such conditions the other dog 38 will have its reach 44 lying in the other recess 46. With the reach 44 lying in the recess 46 the spring 64 urges the inner end of that dog inwardly of its respective groove 16. Such position of the dog is indicated at 72 in Figure 2.

In Figure 4, the flat face of the dog 38 in the position 72 has abutting relation at 74 with the wall of its respective groove 16. The pivot reaches 40 of the dogs 38 lie partly or wholly inside their respective grooves 68 depending upon the position of the cam ring 48. With the parts adjusted according to Figure 4 rotation of the element 22 in such a direction as to force the face 74 of the dog in the 72 position will cause or impart rotation to the body 14. Reverse rotation of the element 22 will bring the angular face 54 of the dog in the 72 position into camming relation with the opposite wall of its respective recess 16, thus permitting the element 22 to be manipulated with respect to the body 14 in the nature of a ratchet mechanism. According to Figure 4 the dog in the 70 position is supported entirely in the clear of the groove 16.

Through the medium of the cam ring 48 the dog in the 72 position may be shifted to the corresponding position of the dog in the 70 position for reversing the action of the ratchet mechanism. Thus the element 22 may be positively connected with the body 14 for turning purposes in either direction through a simple adjustment of the cam ring 48. Sleeve 50 is of such diameter as to hold the pivot reaches 40 in connected relation with the element 22 regardless of the position of the cam ring 48. Collar 24 extends the full length of the sleeve 50 and is slotted at 74 for housing the dogs 38. Faces 52 and 56 are of such area as to lend sufficient strength to the dogs 38 in addition to permitting a preratchet action.

Element 22 is shaped to provide a square shank 76 for the reception of a wrench or socket of a tool. Upon the shank 76 I position a plate 78 having ears 80 pressed into recesses 82 in the shank 76 for connecting purposes. Plate 78 holds the cam ring 48 in place. Sleeve 50 is restrained from relative longitudinal shifting because of the cam ring 48 and the ledge 26. Pin 36 connects the element 22 with the body 14 to permit relative rotary movement for consummating the ratchet action, but the pin restrains the parts from separation. It will thus be seen that the pin 36 and the plate 78 connect all the parts into an operating assembly. In operation the sleeve 50 may be grasped for supporting purposes and a tool applied to the shank 76 for operating the ratchet mechanism. Collar 24 operates to prevent lateral displacement of the dogs 38 because of the slot 72. While the dogs 38 are restrained from lateral displacement, the slots 74 are of such proportion as to permit free pivotal movement of the dogs. Spring 64 operates to shift one dog at a time into ratcheting relation with the body 14 depending upon the position of the cam ring 48. The faces 60 of the recesses 46 engage their respective cam reaches 44 of the dogs 38 to restrain further rotation of the cam ring 48. The cam surfaces 58 are so located as to bring one dog 38 entirely in the clear of the body 14 before the other dog is urged into ratchet relation therewith because of the spring 64.

I claim:

1. A device of the type described comprising a driving member having a flange, a driven member having a shaft part rotatably connected with said driving member and having a shoulder, said shaft part being provided with longitudinal slots, a collar rotatably positioned on said shaft part adjacent said shoulder and having longitudinal slots, reversely acting ratchet elements disposed in the slots in said collar and having fulcrum formations pivoting on said flange, said ratchet elements having extensions adapted to be selectively extended into the slots in said shaft part for connecting the driven member with the driving member for rotation therewith, resilient means associated with said driving member and operatively connected with said ratchet elements for pivoting the same on said flange for urging the extensions inwardly of said shaft part and into the slots therein, a cam ring rotatably mounted on said driving member adjacent one end of said collar and operatively connected with said ratchet elements for selectively shifting the latter into and out of the slots in said shaft part, a sleeve encircling said collar for holding the ratchet elements in position, said sleeve having one end abutting said shoulder and its other end abutting said cam ring, said driving and driven members being keyed against axial separation, and a retaining means carried by the driving member and abutting said cam ring for holding the latter in position against said sleeve and said collar.

2. A device of the type described comprising a driving member having a flange, a driven member having a shaft part rotatably connected with said driving member and having a shoulder, said shaft part being provided with longitudinal slots, a collar rotatably positioned on said shaft part adjacent said shoulder and having longitudinal slots, reversely acting ratchet elements disposed in the slots in said collar and having fulcrum formations pivoting on said flange, said ratchet elements having extensions adapted to be selectively extended into the slots in said shaft part for connecting the driven member with the driving member for rotation therewith, a common resilient means acting on said ratchet elements for pivoting the same on said flange for urging the extensions inwardly of said shaft part and into the slots therein, a cam ring rotatably mounted on said driving member adjacent one end of said collar and operatively connected with said ratchet elements for selectively shifting the latter into and out of the slots in said shaft part, a sleeve encircling said collar for holding the ratchet elements in position, said sleeve having one end abutting said shoulder and its other end abutting said cam ring, said driving and driven members being keyed against axial separation, and a retaining means carried by the driving member and abutting said cam ring for holding the latter in position against said sleeve and said collar.

3. A device of the type described comprising a driving member having a flange, a driven member having a shaft part rotatably connected with said driving member and having a shoulder, said shaft part being provided with longitudinal slots, a collar rotatably positioned on said shaft part adjacent said shoulder and having longitudinal slots, means for keying the collar against longitudinal movement on the shaft part, reversely acting ratchet elements disposed in the slots in said collar and having fulcrum formations pivoting on said flange, said ratchet elements having extensions adapted to be selectively extended into the slots in said shaft part for connecting the driven member with the driving member for rotation therewith, resilient means associated with said driving member and operatively connected with said ratchet elements for pivoting the same on said flange for urging the extensions inwardly of said shaft part and into the slots therein, a cam ring rotatably mounted on said driving member adjacent one end of said collar and operatively connected with said ratchet elements for selectively shifting the latter into and out of the slots in said shaft part, a sleeve encircling said collar for holding the ratchet elements in position, said sleeve having one end abutting said shoulder and its other end abutting said cam ring, said driving and driven members being keyed against axial separation, and a retaining means carried by the driving member and abutting said cam ring for holding the latter in position against said sleeve and said collar.

EDWIN J. JAGLER.